(12) United States Patent
Harold (10) Patent No.: US 11,423,169 B1
(45) Date of Patent: Aug. 23, 2022

(54) SYSTEM, METHOD AND APPARATUS FOR SECURELY STORING DATA ON PUBLIC NETWORKS

(71) Applicant: GoKnown LLC, Aventura, FL (US)

(72) Inventor: Michael D. Harold, Shreveport, LA (US)

(73) Assignee: GoKnown LLC, Shreveport, LA (US)

( * ) Notice: Subject to any disclaimer, the term of this patent is extended or adjusted under 35 U.S.C. 154(b) by 0 days.

(21) Appl. No.: 17/461,127

(22) Filed: Aug. 30, 2021

Related U.S. Application Data (60) Continuation-in-part of application No. 16/673,854, filed on Nov. 4, 2019, now Pat. No. 11,106,814, which is a division of application No. 15/822,404, filed on Nov. 27, 2017, now Pat. No. 10,467,425, which is a division of application No. 14/686,454, filed on Apr. 14, 2015, now Pat. No. 9,830,467.

(60) Provisional application No. 61/979,435, filed on Apr. 14, 2014.

(51) Int. Cl.
| | |
|---|---|
| *G06F 21/00* | (2013.01) |
| *G06F 21/62* | (2013.01) |
| *G06F 21/60* | (2013.01) |
| *H04L 9/08* | (2006.01) |
| *H04L 9/06* | (2006.01) |

(52) U.S. Cl.
CPC ........ *G06F 21/6218* (2013.01); *G06F 21/602* (2013.01); *H04L 9/0656* (2013.01); *H04L 9/0852* (2013.01); *G06F 2221/2107* (2013.01); *H04L 2209/12* (2013.01)

(58) Field of Classification Search
CPC .............. G06F 21/6218; G06F 21/602; G06F 2221/2107; H04L 9/0656; H04L 9/0852; H04L 2209/12
See application file for complete search history.

(56) References Cited

U.S. PATENT DOCUMENTS

| | | | |
|---|---|---|---|
| 7,627,126 B1 * | 12/2009 | Pikalo | H04L 9/0858 356/473 |
| 2002/0106084 A1 | 8/2002 | Azuma et al. | |
| 2003/0096302 A1 | 5/2003 | Yguerabide et al. | |
| 2004/0064261 A1 * | 4/2004 | Gulati | B82Y 5/00 702/19 |
| 2005/0141716 A1 | 6/2005 | Kumar et al. | |
| 2005/0238356 A1 * | 10/2005 | Gilbert | H04B 10/1121 398/118 |
| 2007/0116607 A1 | 5/2007 | Wang et al. | |

(Continued)

OTHER PUBLICATIONS

Kelly, Diana, How Data-Centric Protection Increases Security in Cloud Computing and Virtualization ⁋ SecurityCurve2011.

(Continued)

*Primary Examiner* — Mahfuzur Rahman
(74) *Attorney, Agent, or Firm* — St Onge Steward Johnston and Reens LLC (57) ABSTRACT

A system, method and apparatus that uses a quantum event-based, binary data generation apparatus operating in combination with a single-party or two-party, symmetric and/or asymmetric key storage system to create both random numbers and encryption keys to be used for purposes of encryption and decryption of a user's or organization's file data.

14 Claims, 7 Drawing Sheets

(56) References Cited

U.S. PATENT DOCUMENTS

| | | | |
|---|---|---|---|
| 2008/0263363 A1* | 10/2008 | Jueneman | H04L 63/061 |
| | | | 713/184 |
| 2010/0070780 A1 | 3/2010 | Murao et al. | |
| 2012/0177201 A1* | 7/2012 | Ayling | H04L 9/0858 |
| | | | 380/278 |
| 2012/0328100 A1 | 12/2012 | Hirota | |
| 2015/0104012 A1 | 4/2015 | Holman et al. | |
| 2015/0104013 A1 | 4/2015 | Holman et al. | |
| 2020/0220715 A1* | 7/2020 | Fiske | H04L 9/0819 |
| 2020/0358614 A1* | 11/2020 | Fiske | H04L 9/3228 |

OTHER PUBLICATIONS

Ozcan, A., Demirci, U., Ultra wide-field lens-free monitoring of cells on-chip ⁋ Lab Chip, Jan. 2008; 8(1):98-106, Epub Nov. 1, 2007.

Shannon, Claude, Communication Theory of Secrecy Systems ⁋ Bell System Technical Journal 28(4): 656-715, 1949.

\* cited by examiner

SYSTEM, METHOD AND APPARATUS FOR SECURELY STORING DATA ON PUBLIC NETWORKS

CROSS-REFERENCE TO RELATED APPLICATIONS

The present invention is a continuation-in-part application claiming priority from U.S. patent application Ser. No. 16/673,854, filed Nov. 4, 2019, now U.S. Pat. No. 11,106,814, which is a divisional application claiming priority from U.S. patent application Ser. No. 15/822,404, filed Nov. 27, 2017, now U.S. Pat. No. 10,467,425, which is a divisional application of U.S. patent application Ser. No. 14/686,454, filed Apr. 14, 2015, now U.S. Pat. No. 9,830,467, which claims priority to U.S. Provisional Patent Application Ser. No. 61/979,435, filed Apr. 14, 2014, all entitled "SYSTEM, METHOD AND APPARATUS FOR SECURELY STORING DATA ON PUBLIC NETWORKS," the disclosures of which are incorporated herein by reference.

FIELD OF THE INVENTION

The present invention relates generally to methods for securely storing data on one or more networks. More particularly, the invention relates to a system, method and apparatus for securely storing files and data streams using a combination of storage policy rules and quantum event-based, cryptographic keys.

BACKGROUND OF THE INVENTION

Personal and organizational data security, as applied to the Internet, is a rapidly evolving domain whose capabilities and weaknesses are closely tied to both the current state of cloud computing and the volume, velocity and variety of a person's or organization's data.

Cloud computing, a form of data center computing, is best understood in terms of virtualization, that is, the ability to allocate and scale virtualized compute, store and network resources on demand. Public cloud computing vendors such as Amazon, Google, Rackspace, IBM, HP and Microsoft each use virtualization to manage tens to hundreds of thousands of servers in the service of their customers. Because resources are available and scalable on demand, each person or organization only pays for the resources used. When compared to traditional server-based computing, the lower cost and flexibility of cloud computing allows both individuals and organizations to quickly and cost-effectively implement software applications and services in private clouds, public clouds, or, using a hybrid model, in any combination of the two.

Another trend that effects the decision to move to cloud computing is the continuing and rapid increase in the amount of data generated by individuals and organizations. Such data now includes, in addition to structured application data, unstructured data in the forms of email, text messages and text documents, images, voice communications, videos, video conferences, web site data, social media data and server logs. "Big data" is a term commonly used to refer to this collection of unstructured information. Initially defined by Douglas Laney of the analyst firm Gartner, "Big data is high volume, high velocity, and/or high variety information assets that require new forms of processing to enable enhanced decision making, insight discovery and process optimization," Laney, Douglas. "3D Data Management: Controlling Data Volume, Velocity and Variety."

These two trends, cloud computing and big data, have led computer users to adopt a hybrid approach to cloud data storage in an effort to protect their data assets. The person's or organization's private storage contains the structured data, software, applications and a subset of frequently accessed files. The bulk of the unstructured data is stored in one or more public clouds.

There are, however, several problems associated with the use of a public cloud as a storage service. One is the fact that, once a person's or organization's data has been stored in a public cloud, the data security and management of the stored data becomes dependent on the cloud provider. Because of the liabilities associated with data breaches and data loss, the major cloud storage providers are not willing to assume responsibility for the security and loss of a customer's data. A second problem is that clouds operate in virtualized environments. Virtualized environments are more complex than traditional server and network environments and provide greater opportunities to attackers who can target any or all of the virtual compute, store and network resources used by a cloud storage provider's customers without directly accessing the hardware and firmware underlying those same virtual resources.

The best way to deal with these problems is for the person or organization to assume full control over access, encryption and storage of the data. This data-centric approach first requires that the data is protected both in transit and at rest using file level encryption. Kelly, Diana, "How Data-Centric Protection Increases Security in Cloud Computing and Virtualization," SecurityCurve. 2011. The second major requirement is to provide a method whereby the data can be stored and retrieved using a variety of policies that control the choice of storage location. The combination of file level encryption and flexible storage policy rules guarantees that a person's or organization's encryption and storage of data is fully portable and works transparently across private, public and hybrid cloud computing environments.

To solve these problems, the present invention describes a single-party, symmetric key encryption method that is used for the storage and retrieval of data and that creates a unique symmetric key for use in encrypting file data, whether that file data is an entire file, a section of a file or part of a data stream. The present invention also describes the use of a hashing algorithm such as a SHA-2 or SHA-3 hash of the file data storage instance concatenated with a random number, the result encrypted with a symmetric key, to publicly identify the stored file data. To increase the security of these encryption methods, the present invention also describes an apparatus able to generate random binary data using the output from quantum events, said random binary data used to create random numbers and cryptographic keys. The present invention also describes a method for defining a variety of storage policy rules that can be used to control the choice of storage location or locations for each file data storage instance. These storage policy rules guarantee that a person's or organization's encryption and storage of data is fully portable and works transparently across any combination of private, public and hybrid cloud computing environments.

Although many companies provide cloud storage services, their data protection methods, especially as they relate to the encryption and policy based storage and retrieval of file data, remain subject to the above stated problems, problems remedied by the present invention.

In U.S. Pat. No. 8,620,879, Cairns generally describes a method and system for storing files on a server using a hash value as an identifier. The server determines whether a file exists on the server having the designated hash value. If the hash value exists on the server, the server grants access to the file on the server. If the hash value does not exist on the server, the server requests the file from the user and stores it. The server can control access to the server's copy of the file by requesting that the user provide a file password or a portion of the file for purposes of authentication. There is however, no reference to a single-party or two-party, symmetric key method for accessing the file that removes any requirement on the part of the server to receive either a password or portion of the file from the user. Furthermore, the invention set forth does not provide for single-party or two-party encryption and decryption of the data using quantum event generated, random binary data. Furthermore, the invention set forth does not provide for the enablement of storage policy rules that provide for the storage of file data in multiple storage locations or with multiple storage providers. As a result, the cited reference is deficient.

In U.S. Pat. No. 8,566,362, Mason, Robert, Rodriguez and Andrew generally describe a method and system for storing unstructured data originating in a file system on a public cloud storage service. There is, however, no reference to the ability to store unstructured data from non-filesystem sources. Furthermore, the invention set forth does not provide for single-party or two-party, symmetric key encryption of the data using quantum event generated, random binary data. Furthermore, the invention set forth does not provide for the enablement of storage policy rules that provide for the storage of file data in multiple storage locations or with multiple storage providers. As with the prior cited references, this one, too, is deficient.

In U.S. Pat. No. 8,595,512, Liu generally describes a method for the data control of cloud storage using single-party or two-party, n-bit data blocks generated from the file data and, as an alternative, combining that data with pseudorandom data to create one-time pads. This method is used in an attempt to provide perfect secrecy where the encrypted file data is concerned. Claude Shannon proved that a one-time pad has perfect secrecy only if its key is purely random, that is, given the encrypted message, it is mathematically impossible to derive any additional information about the original file data apart from its length in bits, Shannon, Claude, "Communication Theory of Secrecy Systems," Bell System Technical Journal 28(4): 656-715, 1949.

Although high entropy data can be generated in a number of ways, including the use of a computer's clock data, cpu data and network packet arrival times, all of which are referenced in Liu, the results remain pseudorandom by definition since all of these data results are generated by deterministic means. The only perfectly random events known to science are quantum mechanical in nature. Because the method described in the invention as set forth is used to generate a one-time pad that is actually pseudorandom in nature, that is, it does not rely on quantum events as a source of input in the generation of the one-time pad, the invention as set forth does not meet the Shannon definition for perfect secrecy. Furthermore, the invention as set forth does not provide for the enablement of storage policy rules that in turn provide for the storage of file data in multiple storage locations or with multiple storage providers. As with the prior cited references, this one, too, is deficient.

In U.S. Pat. No. 8,601,265, Mane and Arasanal generally describe a method, system and apparatus for improving storage security in a cloud environment. An interface between a secure microcontroller and a storage controller associated with a client device is used to authenticate a platform associated with the storage controller and to register the storage controller with an authentication server configured to be setup in the cloud environment. The storage controller is authenticated based on a communication protocol between the client device, the authentication server and the storage controller, and by obtaining, at the client device, a signature data of the storage controller following the authentication process. The signature data is configured and stored in the secure microcontroller that is interfaced with the storage controller. The communication between the storage controller and the authentication server is authenticated using a nonce (a pseudorandom or otherwise arbitrary number used once in a cryptographic communication) used in combination with a public key mechanism to secure the communications between the authentication server and the storage controller. Although both the authentication server and storage controller use a nonce in combination with a public key mechanism to secure communication between the two server side devices, the method offers no cloud storage benefits that could not be provided by the use of a single-party, symmetric key mechanism used by the client for accessing data stored in the cloud. Furthermore, the invention set forth does not provide for the enablement of storage policy rules that in turn provide for the storage of file data in multiple storage locations or with multiple storage providers. As with the prior cited references, this one, too, is deficient.

Finally, in an article published by Ozcan, A., Demirci, U., "Ultra wide-field lens-free monitoring of cells on-chip," Lab Chip, 2008 January; 8(1):98-106, Epub 2007 Nov. 1, generally describe the use of an optical sensor in a lens-free apparatus the purpose of which is to view and monitor cells in much the same way that a microscope can be used to view and monitor cells. Their approach is based on a technique generally referred to as LUCAS (Lensless Ultra-wide-field Cell monitoring Array platform based on Shadow imaging). In their apparatus, light from a light source passes through a transparent material such as a glass microfluidic device containing cells in a solution. The fluid container is placed on an optical sensor array such as a CCD or CMOS chip. The shadows of the cells are captured by the chip and transmitted as digital information to a computing device that interprets the data for purposes of health diagnostics and patient point-of-care. There is, however, no reference in this or any other source to the use of a similar apparatus to capture the Brownian random motion of inert particles in a suspension medium and to use that information to create quantum event-based, random binary data.

None of the current methodologies for encrypting file data prior to storing that file data in a private or public cloud use an apparatus operating in the same physical location as the file data, the purpose of which is to generate quantum event-based, binary data for purposes of encryption. Specifically, the prior art fails to demonstrate any system, method or apparatus for generating cryptographic data from a physically present, quantum event-based binary data generation apparatus, said binary data to be used in the creation of random numbers and cryptographic keys.

Furthermore, the prior art also fails to demonstrate any system, method or apparatus whereby file data can be stored in one or more private or public cloud storage provider locations using policies that provide for the storage of files and streaming data originating from multiple data sources, said files and streaming data to be stored in whole or in part in any combination of storage locations and storage providers based on policy rules that use attributes from each storage instance that include but are not limited to the data source, content type, user, user group, user organization, creation date and time, last access date and time and the frequency with which the file data is updated or accessed.

There is, therefore, a present need to provide an improved paradigm, system, method and apparatus for managing the secure, distributed, real-time encryption and storage of data using a quantum event-based, random binary data generator in combination with a single-party or two-party, symmetric and/or asymmetric key storage system that overcomes the aforementioned constraints of existing cloud storage techniques, and that exploits the enhancements of the new technologies offered.

SUMMARY OF THE INVENTION

In contrast to traditional models of encryption, the present invention involves a system, method and apparatus that uses a quantum event-based, binary data generation apparatus operating in combination with a single-party or two-party, symmetric and/or asymmetric key storage system to create both random numbers and encryption keys to be used for purposes of encryption and decryption of a user's or organization's file data.

This system, method and apparatus provides for the encryption, storage and retrieval of file data using a software application residing on a physical or virtual server, a desktop computer or a personal wireless device, with direct access to the quantum event-based, binary data generation apparatus, to securely store file data in one or more storage locations, said locations located on one or more private or public clouds, these private and public clouds in turn operated by one or more cloud storage providers. Additionally, the present invention also describes a method that uses a hashing algorithm, such as a SHA-2 or SHA-3 algorithm, in combination with a random number, the result used as input to a second iteration of the hashing algorithm, to create a public identifier for each storage instance of file data. Additionally, in contrast to methods of cloud storage that confine the user or user's organization to the storage of file data within a single storage provider using a fixed set of policies, the present invention provides for the storage of files and streaming data, in whole or in part, in one or more storage locations operated by one or more cloud storage providers using a variety of policy rules that include, but are not limited to, the data source, content type, user, user group, user organization, creation date and time, last access date and time, and frequency with which the file data is updated or accessed.

It is, accordingly, an object of the present invention to set forth an improved paradigm for the secure storage and retrieval of data in remote storage locations.

It is another object of the present invention to describe an apparatus capable of using Brownian motion to generate random binary data for purposes of encryption.

It is another object of the present invention to describe an apparatus capable of using Browning motion to generate random binary data for purposes of creating random numbers.

It is a further object of the present invention to use random binary data to create one or more cryptographic keys per instance of stored file data.

It is a further object of the present invention to use random binary data to create a cryptographic key to be used in conjunction with any symmetric key algorithm.

It is a further object of the present invention to use random binary data to create a cryptographic key to be used in conjunction with any asymmetric key algorithm.

It is a further object of the present invention to use random binary data to create a one-time pad with which to encrypt and decrypt data.

It is a further object of the present invention to describe a system and method for encrypting, storing and retrieving data from remote storage locations using a single-party, symmetric key storage system and method.

It is a further object of the present invention to describe a system and method for encrypting, storing and retrieving data from remote storage locations using asymmetric key algorithms in combination with a single-party, symmetric key storage system and method.

It is another object of the present invention to describe a system and method for uniquely identifying each instance of stored file data for purposes both of security and to enable single instance storage.

It is a further object of the present invention to enable storage policy rules that provide for the storage of files as one or more stored instances of file data.

It is a further object of the present invention to enable storage policy rules that provide for the storage of streaming data as two or more stored instances of file data.

It is a further object of the present invention to enable storage policy rules that provide for the storage of file data in one or more remote storage locations.

It is a further object of the present invention to enable storage policy rules that provide for the storage of file data in multiple storage provider environments.

It is a further object of the present invention to enable storage policy rules that provide for the storage of file data in one or more storage locations operated by one or more storage providers based on one or more attributes of the file data that include, but are not limited to, the data source, content type, user, user group, user organization, creation date and time, last access date and time and frequency with which the file data is updated or accessed.

It is a further object of the present invention to provide for the encryption, storage and retrieval of file data in one or more storage locations by a software application residing on a server, said physical or virtual server using a quantum event-based binary data generation apparatus to create cryptographic keys for the purpose of encrypting said file data.

It is a further object of the present invention to provide for the encryption, storage and retrieval of file data in one or more storage locations by a software application residing on a personal computer, said computer using a quantum event-based binary data generation apparatus to create cryptographic keys for the purpose of encrypting said file data.

It is a further object of the present invention to provide for the encryption, storage and retrieval of file data in one or more storage locations by a software application residing on a personal wireless device, said personal wireless device using a quantum event-based binary data generation apparatus to create cryptographic keys for the purpose of encrypting said file data.

BRIEF DESCRIPTION OF THE DRAWINGS

A more complete understanding of the system and method of the present invention may be obtained by reference to the following detailed description when taken in conjunction with the accompanying Drawings wherein.

DETAILED DESCRIPTION OF THE INVENTION

To avoid any confusion and to aid in the understanding of the invention, the following definitions of terms used herein are provided:

"Client Application" means any software program that stores and/or retrieves data from a persistent data store. It includes programs that receive input from a person and/or provide output to a person as well as automated programs operating at the application layer, operating system layer or hardware layer that store and/or retrieve data.

"File Data" means any data originating from a Client Application and sent to the Storage System. File Data consists of one or more Storage Instances.

"Storage Instance" means a message sent from a Client Application to the Storage System containing a Storage Instance Header and a Storage Instance Body.

"Storage Instance Header or Header" means a well-defined data structure containing the Private Storage ID of the Storage Instance and data that is used by the Policy Rulebase to identify the Storage Location or Storage Locations in which the File Data will be stored. The Private Storage ID is provided by the Client Application to the Storage System. The Storage Instance Header is specific to the Storage Instance.

"Storage Instance Body" means File Data contained within the Storage Instance that will be encrypted and stored in the Storage Location or Storage Locations identified by the Policy Rulebase.

"Private Storage ID" means a unique identifier associated with a Storage Instance provided by the Client Application to the Storage System.

"Public Storage ID" means a unique identifier associated with a Storage Instance and created by the Storage System to retrieve the encrypted Storage Instance Body from the Storage Location or Storage Locations where it has previously been stored by the Storage System.

"Single-party Encryption" means the private key encryption of deartext File Data contained in the Storage Instance Body of a single Storage Instance prior to storage of the resulting data in one or more Storage Locations as well as the decryption of ciphertext File Data contained in the same Storage Instance Body of a single Storage Instance following retrieval of the data from those same one or more Storage Locations.

"Two-party Encryption" means the single-party, private key encryption of deartext File Data contained in the Storage Instance Body of a single Storage Instance prior to the encryption of the resulting data by any two-party, asynchronous encryption method.

"Data Source" means the Client Application from which the File Data originates. A Client Application may reside on any software on any device with access to the Public, Private or On-Premises Network. This includes enterprise server applications, desktop, portable PC, tablet or smartphone applications, third party applications such as social media websites and Internet services, hosted applications and services, and software agents acting on behalf of a person or organization to collect data from any Data Source.

"Content Type" means the type of data the File Data represents as defined by the Client Application and recorded in the Header of the Storage Instance and/or data type descriptions contained in the File Data. Examples of Content Type include but are not limited to Internet Media Types (i.e., MIME) and other media types as defined by software programs that created and or modified the File Data prior to its submission to the Storage System by the Client Application.

"Storage System" means the system, method and apparatus described in the invention that receives File Data from a Client Application and stores that data in one or more on-premises and/or off-premises Storage Locations based on one or more Storage Policy Rules.

"Rule" means an "if-then" statement that includes one or more assertions that determine whether and how to act in response to the "if-then" decision. A Rule is an element of a set of Rules that together constitute a rule-based system.

"Storage Location" means any form of persistent storage located on a network.

"User" means any person or software program able to store, read, download or delete File Data from a Network Storage Location using the Storage System.

"User Group" means a collection of Users.

"User Organization" means a group of people organized for a particular purpose. Examples include but are not limited to businesses, governmental organizations, non-profit and not-for-profit organizations, clubs and other formal and informal associations of people.

"Request and Reply Interface" means the secure, reliable and well-defined interface whereby File Data may be transmitted between the Client Application and the Storage System and whereby encrypted File Data may be transmitted between the Storage System and one or more Storage Locations.

"Policy Rulebase" means the rule-based system responsible for applying one or more Rules to File Data in order to determine whether it should be stored in one or more specified Private Storage locations and/or one or more specified Public Storage locations. Rule assertions include but are not limited to references to User, User Group and User Organization and the conditions under which File Data associated with a User, User Group or User Organization will be stored in one or more specified Storage Locations; conditions under which File Data from a specific Data Source will be stored in one or more specified Storage Locations; conditions under which File Data of a specific Content Type will be stored in one or more specified Storage Locations; and conditions under which File Data based on other File Data properties such as File Data Creation Date and Time, File Data Last Access Date and Time, and File Data Size in bytes will be stored in one or more specified Storage Locations.

"Storage ID, Compression and Encryption Subsystem" means that part of the Storage System responsible for the creation of File Data IDs and the encryption and decryption of File Data.

"Quantum Data Generator" means that part of the Storage System responsible for the generation of quantum event-based random binary data used by the Storage ID, Compression and Encryption Subsystem in the generation of random numbers and the creation of cryptographic keys. The Quantum Data Generator includes a Light Source, a Brownian Motion Device and an Image Sensor, defined as follows.

"Light Source" means a light source that casts shadows of microspheres contained in the Brownian Motion Detector onto the Image Sensor. These shadows identify the relative position of each microsphere on one or more pixel sensors located on the Image Sensor.

"Brownian Motion Device" means that part of the Quantum Data Generator that consists of a Microfluidic Container comprised of a transparent material such as polydimethylsiloxane (i.e, PDMS) containing microspheres suspended in a fluid, the suspension hermetically sealed with a glass cover. Collisions between the microspheres and the surrounding molecules generate Brownian motion on the part of the microspheres. Random changes in direction on the part of the microspheres are captured by the Image Sensor.

"Microfluidic Container" means an apparatus able to contain the microspheres and the fluid necessary to create Brownian Motion on the parts of the microspheres.

"Image Sensor" means that part of the Quantum Data Generator that captures images resulting from the interaction of the Light Source and the Brownian Motion Device. The captured image data is transmitted to the memory and software of the Storage ID, Compression and Encryption Subsystem as a continuous series of arrays or vectors where each new array or vector is compared to the previous array or vector to identify binary changes in each microsphere's position (ex. UP/DOWN, RIGHT/LEFT, etc.) from one frame or vector to the next. This comparison of each array or vector with the previous array or vector is essentially a two-state, discrete-time Markov process. The binary state changes resulting from this process are converted to binary data. The binary data in turn is used to generate random numbers and to create cryptographic keys.

"Private Storage" means any Network Storage Location containing only that File Data associated with the User, User Group and/or User Organization.

"Public Storage" means any Network Storage Location containing, in addition to the File data associated with the User, User Group and/or User Organization, other File data associated with a different User, User Group and/or User Organization.

"Distributed Ledger" means a database that is decentralized into a multiplicity of peer-to-peer servers residing on a network, each of which contains an identical copy of the ledger data. Incoming transactions and data are consensually shared and synchronized across all servers on the distributed ledger network. Each server in the distributed ledger network is referred to individually as a "distributed ledger node." Consensus requires that, at a minimum, a majority of the distributed ledger nodes on the distributed ledger network establish consensus on the integrity of incoming data and transactions. Each distributed ledger node contains the persisted, immutable record of all data and transactions successfully processed by the distributed ledger.

"Distributed Ledger Node" means an instance of a server node on a distributed ledger network. A distributed ledger node is responsible for verifying the integrity of the data and transactions it sends to and receives from other distributed ledger nodes on the network, participating in the consensus protocol for the distributed ledger network and maintaining a permanent, immutable copy of the resulting distributed ledger record of data and transactions.

"Digital asset" means a file that is created through electronic means and that exists as data on a computer system and/or a digital storage device or devices. "File" means any serialized collection of data one byte or greater in length. Anything that can be represented as a digital file including images, audio, video, text, compound documents such as PDFs and data records can be a digital asset. Any physical item, combination or collection of physical items and combination or collection of physical items and their digital metadata able to be represented as a data file or files can also be treated as a digital asset.

"Non-fungible Token," hereinafter referred to as an "NFT," means a form of digital asset that has unique identification codes and metadata that distinguishes it from any other digital asset. The purpose of the distinguishing data is to establish the identity of the asset and its owner or owners as well as its originality, primacy, precedence, provenance and other characteristics that make it unique. NFTs can be used to represent any form of digital or physical asset.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1A:
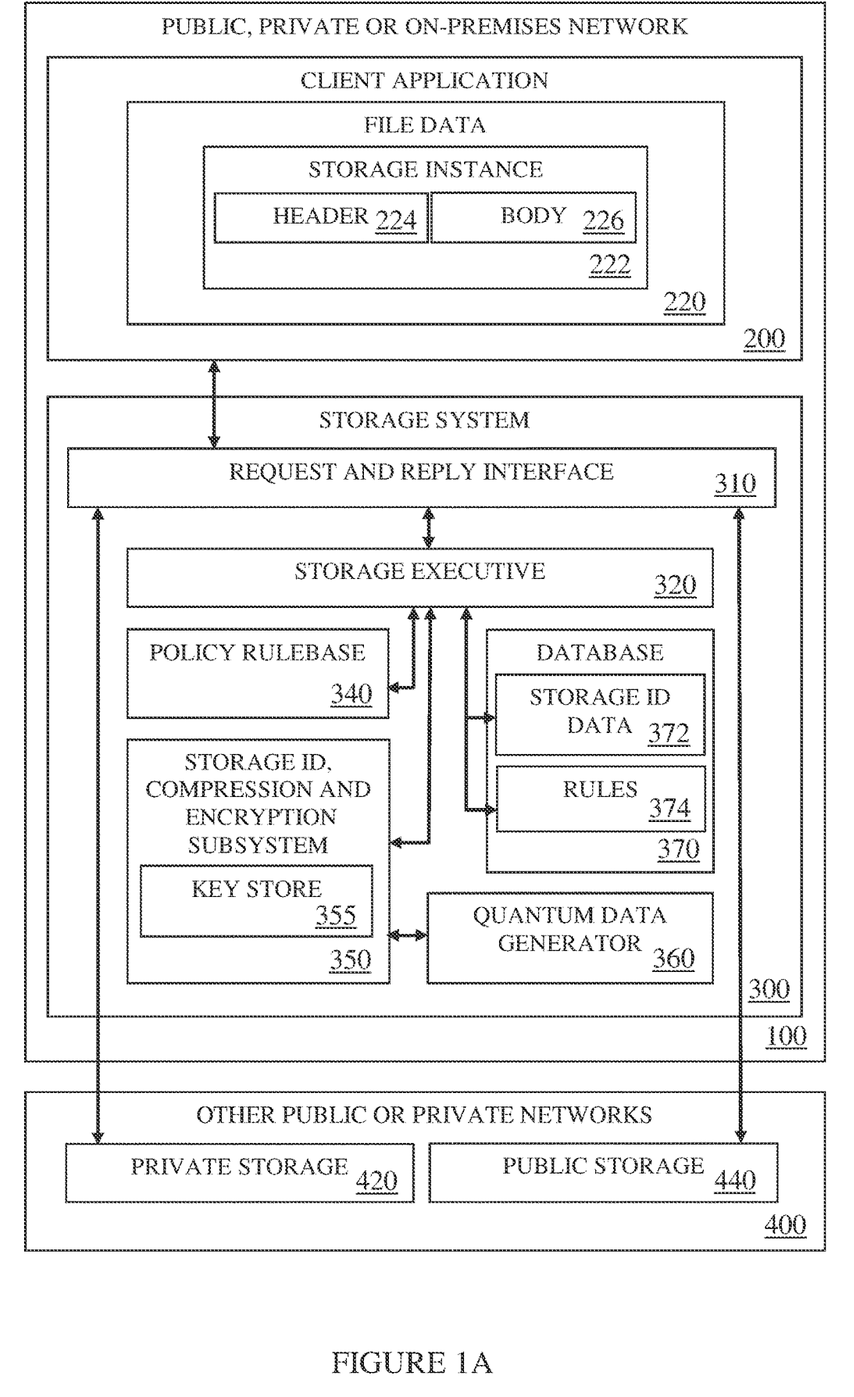
FIG. 1A illustrates a system for securely storing data on a public or private network in accordance with the principles of the present invention.

With reference to FIG. 1A of the Drawings, there is illustrated therein a Public, Private or On-premises Network, generally designated by the reference numeral 100, pursuant to the teachings of the present invention. In particular, a Client Application 200 within the Public, Private or On-premises Network 100 sends File Data 220 in the form of a Storage Instance 222 to a Storage System 300 using a Request and Reply Interface 310, itself a part of the Storage System 300. The Request and Reply interface 310 in turn sends the Storage Instance 222 to the Storage Executive 320. As part of its operation, the Storage Executive 320 receives and stores any additional information, that is, information accompanying and/or included with the Storage Instance 222 in the form of a Storage Instance Header 224, hereinafter referred to as the Header 224, in the Storage ID Data 372 portion of the Database 370. This additional information may include any Storage ID Data 372 used to identify the File Data 220 for purposes of secure storage and retrieval and any Storage ID Data 372 necessary to the execution of Rules 374 used by a Policy Rulebase 340 to identify a Private Storage 420 and/or Public Storage 440 location or locations in which the File Data 220 as represented by the Storage Instance Body 226, hereinafter referred to as the Body 226, of the Storage Instance 222 will be stored. The Storage Locations of the Body 226 of the Storage Instance 222 are also stored by the Storage Executive 320 in the Storage ID Data 372 portion of the Database 370.

As an additional part of its operation, the Storage Executive 320, sends deartext File Data 220 contained in the Body 226 of the Source Instance 222 to, and receives compressed and encrypted ciphertext from, the Storage ID, Compression and Encryption Subsystem 350. The Storage ID, Compression and Encryption Subsystem 350 uses quantum event-based random binary data provided by the Quantum Data Generator 360 to create both Public IDs and cryptographic keys of various types including one-time pads, single-party private symmetric keys and keys for use in various asymmetric public-key protocols. Keys created by the Storage ID, Compression and Encryption System 350 are maintained in a Key Store 355 under the control of the Storage ID, Compression and Encryption Subsystem 350. Using the Request and Reply Interface 310, the Storage Executive 320 sends the compressed and encrypted File Data 220 as represented by the encrypted Body 226 of the Storage Instance 222 to one or more Private Storage 420 and/or Public Storage 440 locations residing on one or more Other Public or Private Networks 400.

With further reference to FIG. 1A, when a Client Application 200 wishes to retrieve File Data 220, the Private Storage ID for the Storage Instance 222 associated with the File Data 220 is sent to the Storage System 300 using the Request and Reply Interface 310. The Storage Executive 320 uses the Private Storage ID to retrieve previously stored File Data 220 from said one or more Private Storage 420 and/or Public Storage 440 locations residing on one or more Other Public or Private Networks 400 via the Request and Reply Interface 310. Once retrieved, the File Data 220 is unencrypted and uncompressed by the Compression and Encryption Subsystem 350, after which it is transmitted by the Storage Executive 320, using the Request and Reply Interface 310, to the Client Application 200.

With Additional reference to FIG. 1A, a more detailed description is provided of one method by which File Data 220 may be stored by the Storage System 300. The method involves the use of a Storage Executive 320, a Policy Rulebase 340, a Storage ID, Compression and Encryption Subsystem 350, and a Database 370 within the Storage System 300 that stores both the Storage ID Data 372 associated with the Storage Instance 222 and the Rules 374 used by the Policy Rulebase 340 to determine in which Private Storage 420 and/or Public Storage 440 location or locations the File Data 220 contained in the Body 226 of the Storage Instance 222 will be stored.

Again, the storage of the File Data 220 begins when the File Data 220 in the form of a Storage Instance 222 is received by the Storage Executive 320 via the Request and Reply Interface 310 as a result of a storage request by the Client Application 200. Once the Storage Executive 320 verifies that the Private Storage ID does not exist in the Storage ID Data 372 portion of the Database 370, the Storage Executive 320 stores the data contained in the Header of the Storage Instance 222 in the Storage ID Data 372 portion of the Database 370. Data stored by the Storage Executive 320 in the Storage ID Data 372 portion of the Database 370 includes the Private Storage ID of the Storage Instance 222 as well as any additional data to be used by the Policy Rulebase 340 to determine in which Private Storage 420 and/or Public Storage 440 location or locations the File Data 220 contained in the Body 226 of the Storage Instance 222 will be stored. This additional data includes but is not limited to the Data Source, Content Type, User, User Group, User Organization and the File Data Creation Date and Time of the File Data 220 all of which are contained in the Header 226 of the Storage Instance 222.

Additionally, the Storage Executive may calculate and store additional data, including but not limited to the Size in Bytes of the Body 226 along with the other, previously identified data associated with the Private Storage ID of the Storage Instance 222. Following storage of the Header 224 data by the Storage Executive 320 in the Database 370, The Storage Executive 320 makes the Private Storage ID as well as the additional data contained in the Header 224 available to the Policy Rulebase 340; and the Private Storage ID as well as the File Data 220 contained in the Body 226 of the Storage Instance 222 available to the Storage ID, Compression and Encryption Subsystem 350.

The Storage ID, Compression and Encryption Subsystem 350 creates a hash value from the File Data 220 contained in the Storage Instance Body of the Storage Instance 222 using a hash function such as a SHA-2 or SHA-3. The resulting hash value is concatenated with a random number generated by the Quantum Data Generator 360 and a second hash value is created from the result. This second hash value is the Public Storage ID. The Storage ID, Compression and Encryption Subsystem 350 returns the Private Storage ID and both hash values to the Storage Executive 320 which includes them with the Header data associated with the Private Storage ID. Asynchronously with the operation of the Storage ID, Compression and Encryption Subsystem 350, the Policy Rulebase 340 inspects the Header of the Storage Instance 222 to acquire information necessary to the execution of Rules 374 contained in the Database 370, said Rules 374 selected by the Storage Executive 320 from the Database 370 and stored in the temporary working memory of the Policy Rulebase 340 prior to the access and inspection of File Data 220 and its associated Storage Instances 222 by the Policy Rulebase 340.

File Data 220 attributes used by the Policy Rulebase 340 in the execution of Rules 374 include but are not limited to Data Source, Content Type, User, User Group, User Organization and File Data Creation Date and Time. Upon completion of its examination of the File Data 220 as represented by the Storage Instance 222, the Policy Rulebase 340 identifies the Private Storage 420 location or locations and/or Public Storage 440 location or locations where the File Data 220 as represented by the Body of the Storage Instance 222 will be stored and returns the Private Storage ID and location data to the Storage Executive 320. Following receipt of the Private Storage ID and location data from the Policy Rulebase 340 by the Storage Executive 320 the location data is stored by the Storage Executive 320 in the Storage ID Data 372 portion of the Database 370 along with the other data associated with the specified Private Storage ID. Following compression of the data contained in the Body of the Storage Instance 222, the Storage ID, Compression and Encryption Subsystem 350 uses the Quantum Data Generator 360 to create one or more cryptographic keys to encrypt the compressed data.

The cryptographic keys used to encrypt the data are stored along with the Private Storage ID in the Key Store 355 maintained by the Compression and Encryption Subsystem. The Private Storage ID and File Data 200 as represented by the compressed and encrypted Body 226 of the Storage Instance 222 is returned to the Storage Executive 320 by the Compression and Encryption Subsystem 350. Once the Storage Executive 320 has received all of the data associated with the specified Private Storage ID from the Storage ID, Compression and Encryption Subsystem 350 and the Policy Rulebase 340, the encrypted File Data 220 as represented by the Body of the Storage Instance 222 is then stored in the specified one or more Private Storage 420 and/or Public Storage 440 locations residing on one or more public or private networks 400 using the Public Storage ID. Following storage of the encrypted File Data 220, the Private Storage ID associated with the File Data 220 as represented by the Storage Instance 222 is returned along with a success or error code to the Client Application 200 by the Storage Executive 320 using the Request and Reply Interface 310.

With further reference to FIG. 1A, a more detailed description is provided of one method by which File Data 220 may be retrieved by the Storage System 300. The method involves the use of the Storage Executive 320 and the Storage ID, Compression and Encryption Subsystem 350. The retrieval of the File Data 220 begins when a retrieval request containing the Private Storage ID of a Storage Instance 222 is received by the Storage Executive 320 via the Request and Reply Interface 310 from the Client Application 200. The Storage Executive 320 queries the Storage Data ID 372 portion of the Database 370 for the Private Storage ID. If found, the Storage Executive uses the Public Storage ID associated with the Private Storage ID to retrieve the Storage Instance 222 associated with the File Data 220 from the Storage Instance's 222 designated Private Storage 420 and/or Public Storage 440 location and/or locations. For the sake of efficiency, in the event that a copy of the specified Storage Instance 222 exists in more than one location, a single location may be specified so that only one copy Body 226 of the Storage Instance 222 is returned. The Storage Executive 320 notifies the Storage ID, Compression and Encryption Subsystem 350 that the File Data 220 as represented by the Body 226 or Bodies 226 of the Storage Instance 222 or Storage Instances 222 is available for processing.

The Storage ID, Compression and Encryption Subsystem 350 first uses the Private Storage ID to identify the key or keys associated with the Storage Instance in the Key Store 355 and uses those keys to decrypt the Body 226 of the Storage Instance 222. Following the decryption of the Body 226 of the Storage Instance 222, the Storage ID, Compression and Encryption Subsystem 350 uncompresses the Body 226 of the Storage Instance 222. The Storage ID, Compression and Encryption Subsystem 350 then calculates a hash of the Body 226 using the same hash function used when the Storage Instance 222 was originally stored by the Storage Executive 320 in the designated Private Storage 420 and Public Storage 440 location or locations. The Storage ID, Compression and Encryption Subsystem 350 returns the resulting hash value to the Storage Executive 320 which uses the hash value to query the Storage ID Data 382 portion of the Database 380 in order to determine whether or not the hash value already exists and is identical to the first hash value of the Body 226 created by the Storage ID, Compression and Encryption Subsystem 350 when the Body 226 associated with the Private Storage ID was originally stored in the specified Private Storage and/or Public Storage location or locations. Following verification of the hash value associated with the Body 226 of the Storage Instance 222, the Storage Executive 320 returns the Private ID and the Body 226 of the specified Storage Instance, along with any success or error codes, to the Client Application 200 using the Request and Reply Interface 310.

Figure 1B:
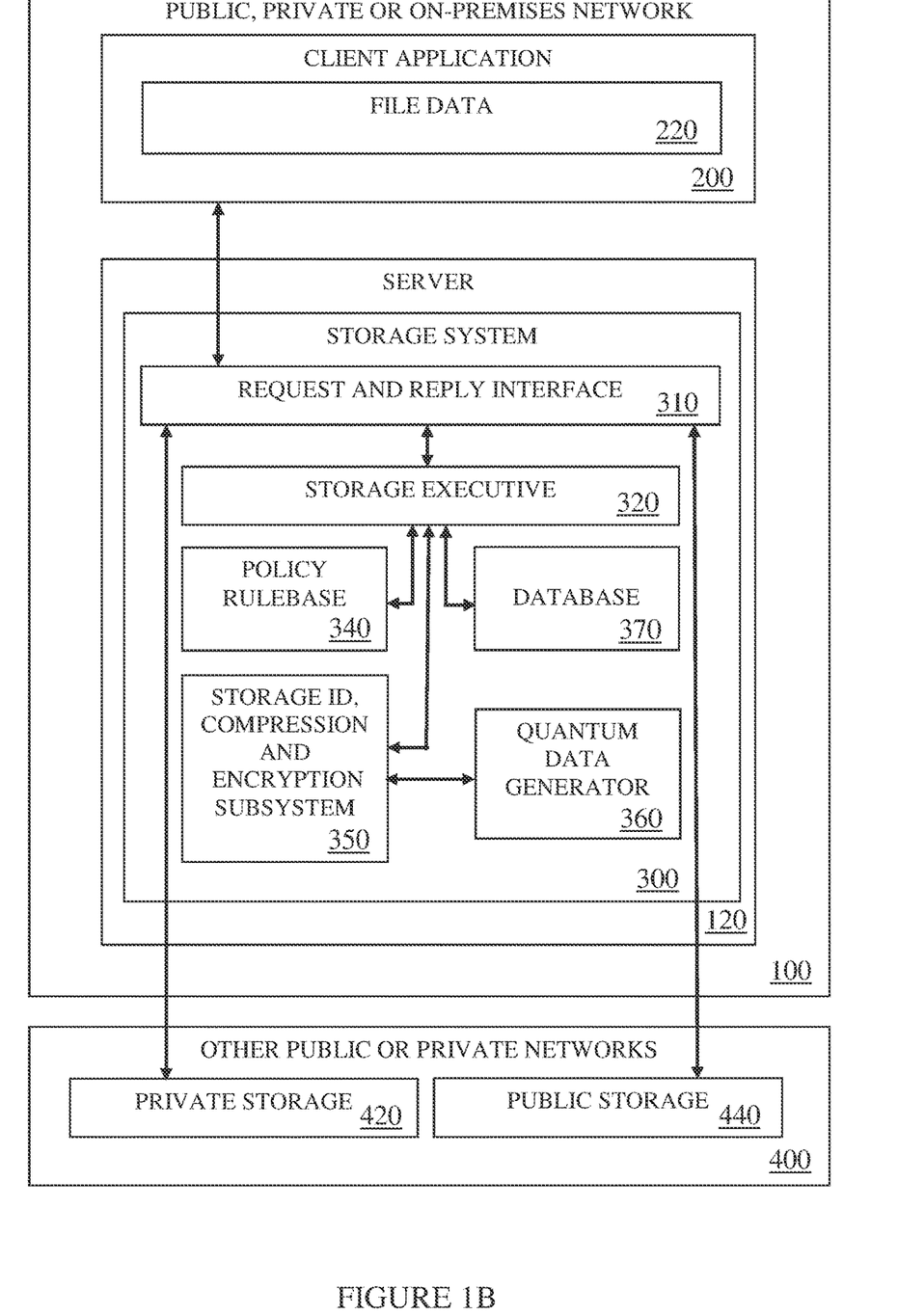
FIG. 1B illustrates a system for securely storing data on a public or private network using a server in accordance with the principles of the present invention.

With reference now to FIG. 1B of the DRAWINGS, there is illustrated therein an embodiment of the present invention that uses a Server 120 to host the Storage System 300. A Client Application 200 within the Public, Private or On-premises Network 100 sends File Data 220 to a Storage System 300 located on a Server 120, said Server 120 residing on the Public, Private or On-premises Network 100. The Client Application 200 communicates with the Storage System 300 using a Request and Reply Interface 310. The Request and Reply interface 310 in turn sends the File Data 220 to the Storage Executive 320. The Storage Executive 320 processes the File Data 220 using the Policy Rulebase 340, the Storage ID, Compression and Encryption Subsystem 350 and the Database 370. As part of its operations, the Storage ID, Compression and Encryption Subsystem 350 receives cryptographic key data from the Quantum Data Generator 360. Following completion of the processing of the File Data 220 received from the Client Application 200, the Storage Executive 320, using the Request and Reply Interface 310, sends the compressed and encrypted File Data 220 to one or more Private Storage 420 and/or Public Storage 440 locations residing on one or more Other Public or Private Networks 400.

With further reference to FIG. 1B, when a Client Application 200 wishes to retrieve File Data 220, the request is sent to the Storage System 300 located on said Server 120 using the Request and Reply Interface 310. The Storage Executive 320 retrieves the previously stored File Data 220 from said one or more Private Storage 420 and/or Public Storage 440 locations residing on one or more Other Public or Private Networks 400 via the Request and Reply Interface 310. Once retrieved, the File Data 220 is unencrypted and uncompressed by the Compression and Encryption Subsystem 350, after which it is transmitted by the Storage Executive 320 using the Request and Reply Interface 310 to the Client Application 200.

Figure 1C:
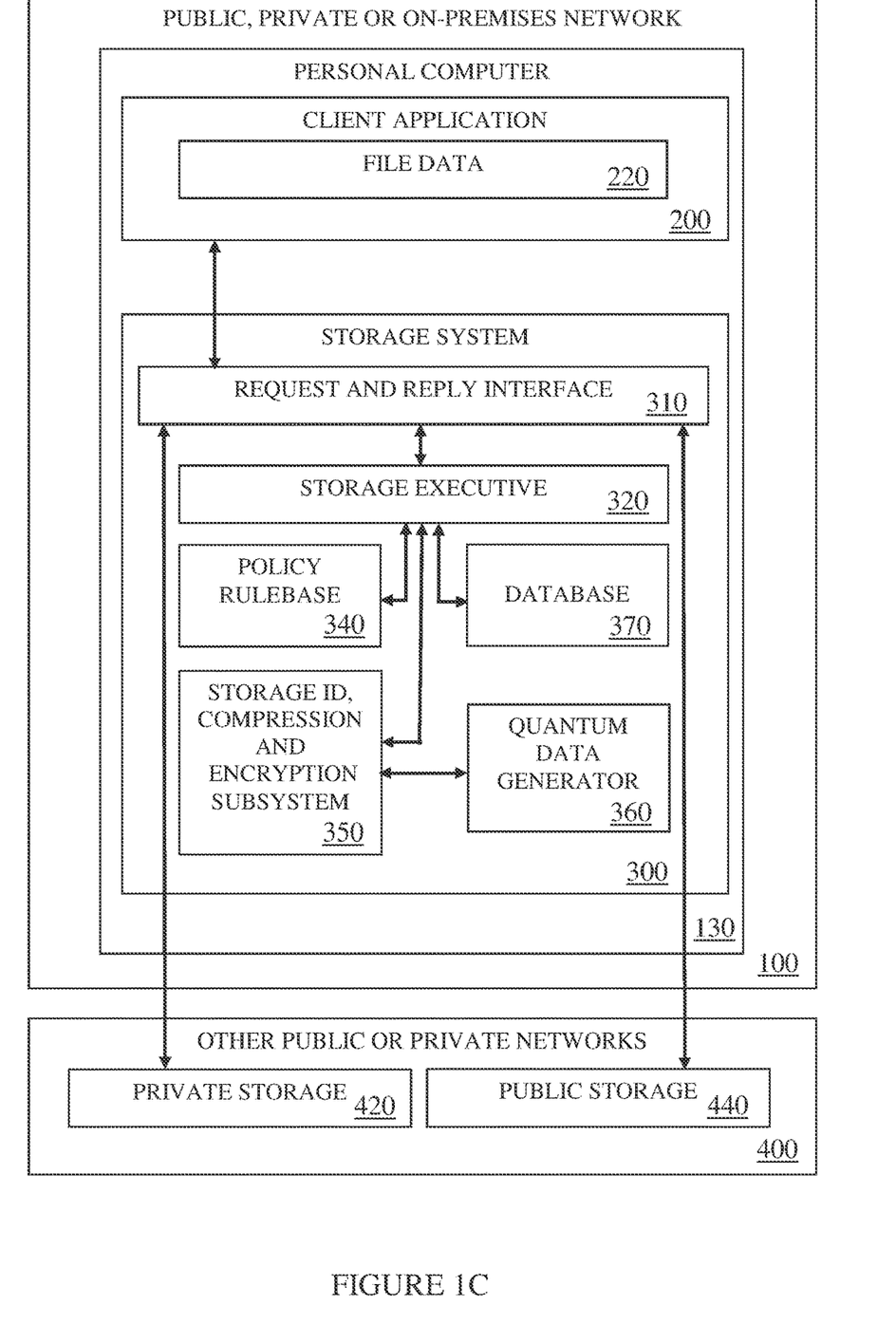
FIG. 1C illustrates a system for securely storing data on a public or private network using a personal computer in accordance with the principles of the present invention.

With reference now to FIG. 1C of the DRAWINGS, another embodiment of the present invention that uses a Personal Computer 130 to host the Client Application 200, the File Data 220 and the Storage System 300 is described. The Client Application 200 within the Personal Computer 130 sends File Data 220 to the Storage System 300 located on the Personal Computer 130, said Personal Computer 130 connected to the Public, Private or On-premises Network 100. The Client Application 200 communicates with the Storage System 300 using a Request and Reply Interface 310. The Request and Reply interface 310 in turn sends the File Data 220 to the Storage Executive 320. The Storage Executive 320 processes the File Data 220 using the Policy Rulebase 340, the Storage ID, Compression and Encryption Subsystem 350 and the Database 370. As part of its operations, the Storage ID, Compression and Encryption Subsystem 350 receives cryptographic key data from the Quantum Data Generator 360. Following completion of the processing of the File Data 220 received from the Client Application 200, the Storage Executive 320, using the Request and Reply Interface 310, sends the compressed and encrypted File Data 220 to one or more Private Storage 420 and/or Public Storage 440 locations residing on one or more Other Public or Private Networks 400.

With further reference to FIG. 1C, when a Client Application 200 wishes to retrieve File Data 220, the request is sent to the Storage System 300 located on said Personal Computer 130 using the Request and Reply Interface 310. The Storage Executive 320 retrieves the previously stored File Data 220 from said one or more Private Storage 420 and/or Public Storage 440 locations residing on one or more Other Public or Private Networks 400 via the Request and Reply Interface 310. Once retrieved, the File Data 220 is unencrypted and uncompressed by the Compression and Encryption Subsystem 350, after which it is transmitted by the Storage Executive 320 using the Request and Reply Interface 310 to the Client Application 200.

Figure 1D:
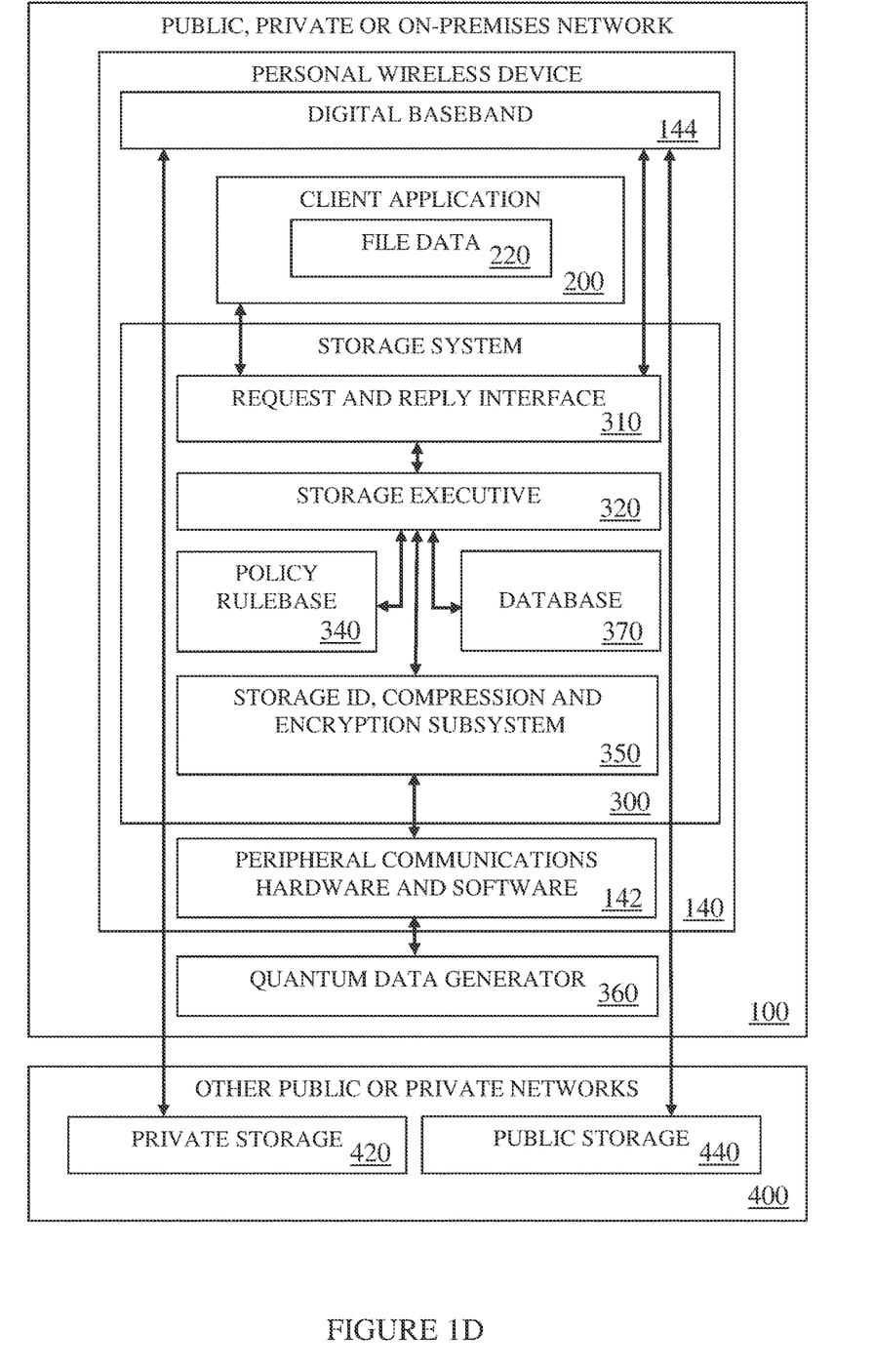
FIG. 1D illustrates a system for securely storing data on a public or private network using a personal wireless device with a quantum event-based binary data generation apparatus attached to the wireless device in accordance with the principles of 5 the present invention.

With reference now to FIG. 1D of the DRAWINGS, an embodiment of the present invention that uses a Personal Wireless Device 140 to host the Client Application 200, the File Data 220 and the Storage System 300 is described. The Client Application 200 within the Personal Wireless Device 140 sends File Data 220 to the Storage System 300 located on the Personal Wireless Device 140, said Personal Wireless Device 140 connected to the Public, Private or On-premises Network 100 using the Digital Baseband 144 service or services available in the Personal Wireless Device 140. The Quantum Data Generator 360, itself a physically separate apparatus from the Personal Wireless Device 140, communicates with the Storage ID, Compression and Encryption Subsystem 350 using the Peripheral Communications Hardware and Software 142 contained in the Personal Wireless Device 140. The aforementioned Peripheral Communications Hardware and Software 142 may include, but is not limited to hardware and software that support the IEEE 1394, Universal Serial Bus, Mobile High-Definition Link and High-Definition Multimedia Interface specifications.

The Client Application 200 communicates with the Storage System 300 using a Request and Reply Interface 310. The Request and Reply interface 310 in turn sends the File Data 220 to the Storage Executive 320. The Storage Executive 320 processes the File Data 220 using the Policy Rulebase 340, the Storage ID, Compression and Encryption Subsystem 350 and the Database 370. As part of its operations, the Storage ID, Compression and Encryption Subsystem 350 receives cryptographic key data from the Quantum Data Generator 360 through the Peripheral Communications Hardware and Software 142. Following completion of the processing of the File Data 220 received from the Client Application 200, the Storage Executive 320, using the Request and Reply Interface 310, sends the compressed and encrypted File Data 220 to one or more Private Storage 420 and/or Public Storage 440 locations residing on one or more Other Public or Private Networks 400. When sending the compressed and encrypted File Data 220 to the one or more Private Storage 420 and/or Public Storage 440 locations residing on one or more Other Public or Private Networks 400, the Request and Reply Interface 310 communicates directly with the Digital Baseband 144 communications service or services of the Personal Wireless Device 140.

With further reference to FIG. 1D of the DRAWINGS, when a Client Application 200 wishes to retrieve File Data 220, the request is sent to the Storage System 300 located on said Personal Wireless Device 140 using the Request and Reply Interface 310. The Storage Executive 320 retrieves the previously stored File Data 220 from said one or more Private Storage 420 and/or Public Storage 440 locations residing on one or more Other Public or Private Networks 400 via the Request and Reply Interface 310. When retrieving the compressed and encrypted File Data 220 from the one or more Private Storage 420 and/or Public Storage 440 locations residing on one or more Other Public or Private Networks 400, the Request and Reply Interface 310 communicates directly with the Digital Baseband 144 communications service or services of the Personal Wireless Device 140. Once retrieved, the File Data 220 is unencrypted and uncompressed by the Compression and Encryption Subsystem 350, after which it is transmitted by the Storage Executive 320 using the Request and Reply Interface 310 to the Client Application 200.

Figure 1E:
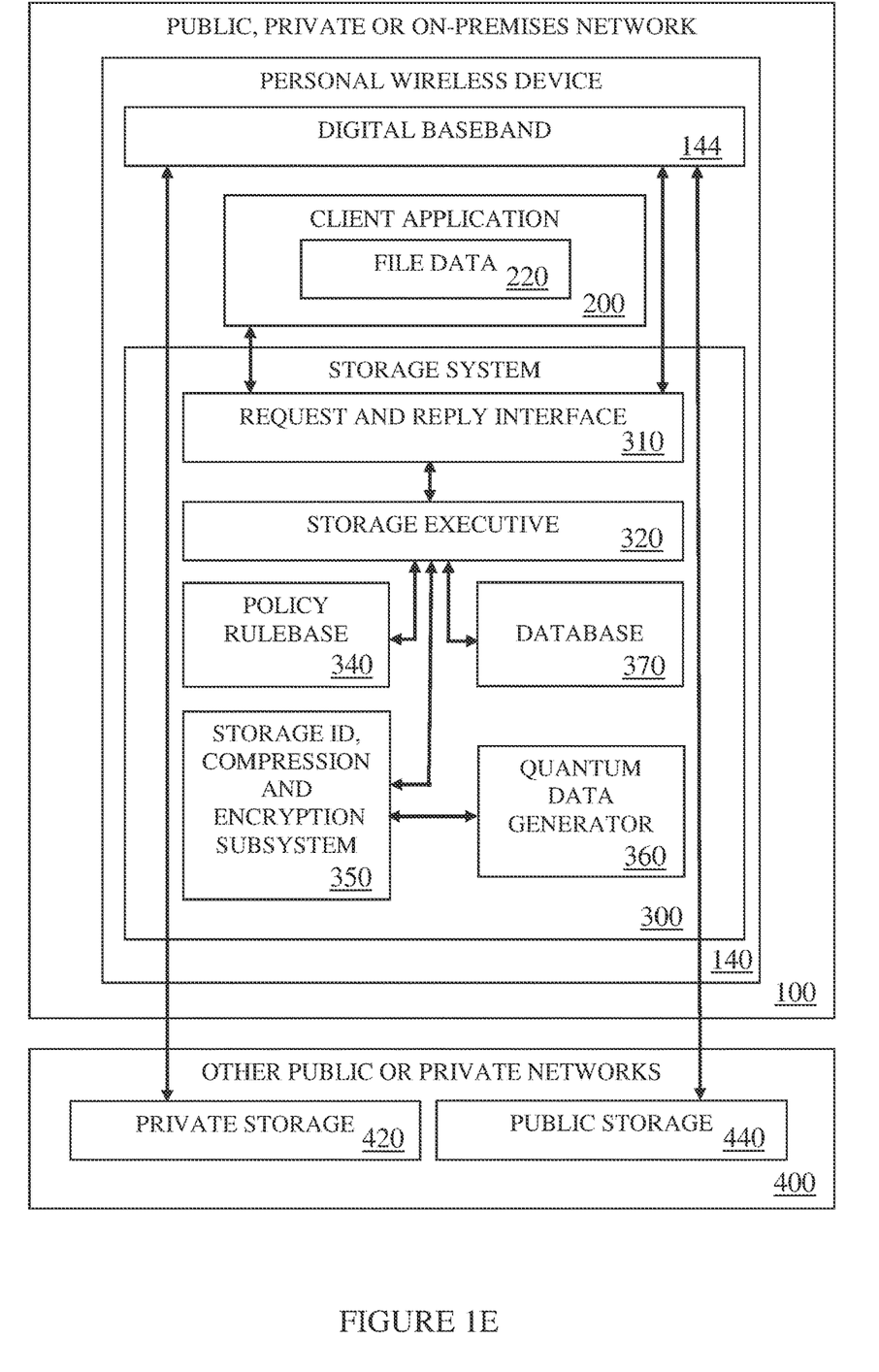
FIG. 1E illustrates a system for securely storing data on a public or private network using a personal wireless device with a quantum event-based binary data generation apparatus contained within the wireless device in accordance with the principles of the present invention.

With reference now to FIG. 1E of the DRAWINGS, a still further embodiment of the present invention that uses a Personal Wireless Device 140 to host the Client Application 200, the File Data 220 and the Storage System 300 is described. The Client Application 200 within the Personal Wireless Device 140 sends File Data 220 to the Storage System 300 located on the Personal Wireless Device 140, said Personal Wireless Device 140 connected to the Public, Private or On-premises Network 100 using the Digital Baseband 144 service or services available in the Personal Wireless Device 140. The Client Application 200 communicates with the Storage System 300 using a Request and Reply Interface 310. The Request and Reply interface 310 in turn sends the File Data 220 to the Storage Executive 320. The Storage Executive 320 processes the File Data 220 using the Policy Rulebase 340, the Storage ID, Compression and Encryption Subsystem 350 and the Database 370. As part of its operations, the Storage ID, Compression and Encryption Subsystem 350 receives cryptographic key data from the Quantum Data Generator 360, itself contained within the Personal Wireless Device 140. Following completion of the processing of the File Data 220 received from the Client Application 200, the Storage Executive 320, using the Request and Reply Interface 310, sends the compressed and encrypted File Data 220 to one or more Private Storage 420 and/or Public Storage 440 locations residing on one or more Other Public or Private Networks 400. When sending the compressed and encrypted File Data 220 to the one or more Private Storage 420 and/or Public Storage 440 locations residing on one or more Other Public or Private Networks 400, the Request and Reply Interface 310 communicates directly with the Digital Baseband 144 communications service or services of the Personal Wireless Device 140.

With further reference to FIG. 1E, when a Client Application 200 wishes to retrieve File Data 220, the request is sent to the Storage System 300 located on said Personal Wireless Device 140 using the Request and Reply Interface 310. The Storage Executive 320 retrieves the previously stored File Data 220 from said one or more Private Storage 420 and/or Public Storage 440 locations residing on one or more Other Public or Private Networks 400 via the Request and Reply Interface 310. When retrieving the compressed and encrypted File Data 220 from the one or more Private Storage 420 and/or Public Storage 440 locations residing on one or more Other Public or Private Networks 400, the Request and Reply Interface 310 communicates directly with the Digital Baseband 144 communications service or services of the Personal Wireless Device 140. Once retrieved, the File Data 220 is unencrypted and uncompressed by the Compression and Encryption Subsystem 350, after which it is transmitted by the Storage Executive 320 using the Request and Reply Interface 310 to the Client Application 200.

Figure 1F:
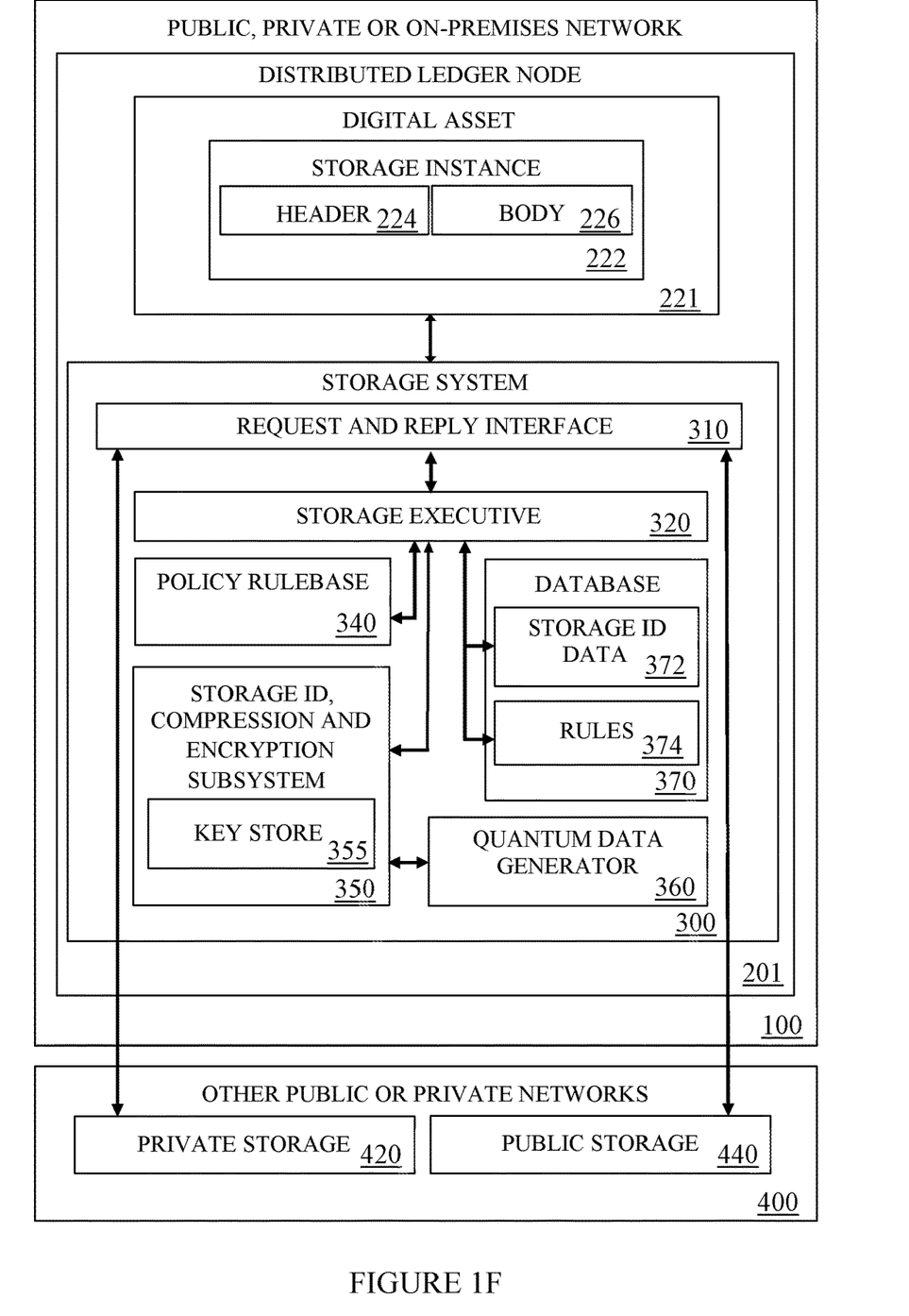
FIG. 1F illustrates a system for securely storing data on a public or private network using a server as a distributed ledger node in accordance with the principles of the present invention.

With reference to FIG. 1F, there is illustrated therein a Public, Private or On-premises Network, generally designated by the reference numeral 100, pursuant to the teachings of the present invention. In particular, a Distributed Ledger Node 201 within the Public, Private or On-premises Network 100 sends a Digital Asset 221 in the form of a Storage Instance 222 to a Storage System 300 using a Request and Reply Interface 310, itself a part of the Storage System 300. The Request and Reply interface 310 in turn sends the Storage Instance 222 to the Storage Executive 320.

As part of its operation, the Storage Executive 320 receives and stores any additional information, that is, information accompanying and/or included with the Storage Instance 222 in the form of a Storage Instance Header 224, hereinafter referred to as the Header 224, in the Storage ID Data 372 portion of the Database 370. This additional information may include any Storage ID Data 372 used to identify the Digital Asset 221 for purposes of secure storage and retrieval and any Storage ID Data 372 necessary to the execution of Rules 374 used by a Policy Rulebase 340 to identify a Private Storage 420 and/or Public Storage 440 location or locations in which the Digital Asset 221 as represented by the Storage Instance Body 226, hereinafter referred to as the Body 226, of the Storage Instance 222 will be stored. The Storage Locations of the Body 226 of the Storage Instance 222 are also stored by the Storage Executive 320 in the Storage ID Data 372 portion of the Database 370.

As an additional part of its operation, the Storage Executive 320, sends the Digital Asset 221 contained in the Body 226 of the Source Instance 222 as cleartext to, and receives compressed and encrypted ciphertext from, the Storage ID, Compression and Encryption Subsystem 350. The Storage ID, Compression and Encryption Subsystem 350 uses quantum event-based random binary data provided by the Quantum Data Generator 360 to create both Public IDs and cryptographic keys of various types including one-time pads, single-party private symmetric keys and keys for use in various asymmetric public-key protocols. Keys created by the Storage ID, Compression and Encryption System 350 are maintained in a Key Store 355 under the control of the Storage ID, Compression and Encryption Subsystem 350. Using the Request and Reply Interface 310, the Storage Executive 320 sends the compressed and encrypted Digital Asset 221 as represented by the encrypted Body 226 of the Storage Instance 222 to one or more Private Storage 420 and/or Public Storage 440 locations residing on one or more Other Public or Private Networks 400.

With further reference to FIG. 1F, when a Distributed Ledger Node 201 wishes to retrieve a Digital Asset 221, the Private Storage ID for the Storage Instance 222 associated with the Digital Asset 221 is sent to the Storage System 300 using the Request and Reply Interface 310. The Storage Executive 320 uses the Private Storage ID to retrieve previously stored Digital Asset 221 from said one or more Private Storage 420 and/or Public Storage 440 locations residing on one or more Other Public or Private Networks 400 via the Request and Reply Interface 310. Once retrieved, the Digital Asset 221 is unencrypted and uncompressed by the Compression and Encryption Subsystem 350, after which it is transmitted by the Storage Executive 320, using the Request and Reply Interface 310, to the Distributed Ledger Node 201.

With Additional reference to FIG. 1F, a more detailed description is provided of one method by which Digital Asset 221 may be stored by the Storage System 300. The method involves the use of a Storage Executive 320, a Policy Rulebase 340, a Storage ID, Compression and Encryption Subsystem 350, and a Database 370 within the Storage System 300 that stores both the Storage ID Data 372 associated with the Storage Instance 222 and the Rules 374 used by the Policy Rulebase 340 to determine in which Private Storage 420 and/or Public Storage 440 location or locations the Digital Asset 221 contained in the Body 226 of the Storage Instance 222 will be stored.

Again, the storage of the Digital Asset 221 begins when the Digital Asset 221 in the form of a Storage Instance 222 is received by the Storage Executive 320 via the Request and Reply Interface 310 as a result of a storage request by the Distributed Ledger Node 201. Once the Storage Executive 320 verifies that the Private Storage ID does not exist in the Storage ID Data 372 portion of the Database 370, the Storage Executive 320 stores the data contained in the Header of the Storage Instance 222 in the Storage ID Data 372 portion of the Database 370. Data stored by the Storage Executive 320 in the Storage ID Data 372 portion of the Database 370 includes the Private Storage ID of the Storage Instance 222 as well as any additional data to be used by the Policy Rulebase 340 to determine in which Private Storage 420 and/or Public Storage 440 location or locations the Digital Asset 221 contained in the Body 226 of the Storage Instance 222 will be stored. This additional data includes but is not limited to the Data Source, Content Type, User, User Group, User Organization and the Creation Date and Time of the Digital Asset 221 all of which are contained in the Header 226 of the Storage Instance 222. Other metadata associated with the Digital Asset 221 such as its owner or owners, individual and group read permissions and other metadata related to the Digital Asset's 221 originality, primacy, precedence and provenance. Additionally, the Storage Executive may calculate and store additional data, including but not limited to the Size in Bytes of the Body 226 along with the other, previously identified data associated with the Private Storage ID of the Storage Instance 222. Following storage of the Header 224 data by the Storage Executive 320 in the Database 370, The Storage Executive 320 makes the Private Storage ID as well as the additional data contained in the Header 224 available to the Policy Rulebase 340; and the Private Storage ID as well as the Digital Asset 221 contained in the Body 226 of the Storage Instance 222 available to the Storage ID, Compression and Encryption Subsystem 350.

The Storage ID, Compression and Encryption Subsystem 350 creates a hash value from the Digital Asset 221 contained in the Storage Instance Body of the Storage Instance 222 using a hash function such as a SHA-2 or SHA-3. The resulting hash value is concatenated with a random number generated by the Quantum Data Generator 360 and a second hash value is created from the result. This second hash value is the Public Storage ID. The Storage ID, Compression and Encryption Subsystem 350 returns the Private Storage ID and both hash values to the Storage Executive 320 which includes them with the Header data associated with the Private Storage ID. Asynchronously with the operation of the Storage ID, Compression and Encryption Subsystem 350, the Policy Rulebase 340 inspects the Header of the Storage Instance 222 to acquire information necessary to the execution of Rules 374 contained in the Database 370, said Rules 374 selected by the Storage Executive 320 from the Database 370 and stored in the temporary working memory of the Policy Rulebase 340 prior to the access and inspection of a Digital Asset 221 and its associated Storage Instances 222 by the Policy Rulebase 340.

Digital Asset 221 attributes used by the Policy Rulebase 340 in the execution of Rules 374 include but are not limited to Data Source, Content Type, User, User Group, User Organization and Digital Asset Creation Date and Time. Upon completion of its examination of the Digital Asset 221 as represented by the Storage Instance 222, the Policy Rulebase 340 identifies the Private Storage 420 location or locations and/or Public Storage 440 location or locations where the Digital Asset 221 as represented by the Body of the Storage Instance 222 will be stored and returns the Private Storage ID and location data to the Storage Executive 320. Following receipt of the Private Storage ID and location data from the Policy Rulebase 340 by the Storage Executive 320 the location data is stored by the Storage Executive 320 in the Storage ID Data 372 portion of the Database 370 along with the other data associated with the specified Private Storage ID. Following compression of the data contained in the Body of the Storage Instance 222, the Storage ID, Compression and Encryption Subsystem 350 uses the Quantum Data Generator 360 to create one or more cryptographic keys to encrypt the compressed data.

The cryptographic keys used to encrypt the data are stored along with the Private Storage ID in the Key Store 355 maintained by the Compression and Encryption Subsystem. The Private Storage ID and Digital Asset 221 as represented by the compressed and encrypted Body 226 of the Storage Instance 222 is returned to the Storage Executive 320 by the Compression and Encryption Subsystem 350. Once the Storage Executive 320 has received all of the data associated with the specified Private Storage ID from the Storage ID, Compression and Encryption Subsystem 350 and the Policy Rulebase 340, the encrypted Digital Asset 221 as represented by the Body of the Storage Instance 222 is then stored in the specified one or more Private Storage 420 and/or Public Storage 440 locations residing on one or more public or private networks 400 using the Public Storage ID. Following storage of the encrypted Digital Asset 221, the Private Storage ID associated with the Digital Asset 221 as represented by the Storage Instance 222 is returned along with a success or error code to the Distributed Ledger Node 201 by the Storage Executive 320 using the Request and Reply Interface 310.

With further reference to FIG. 1F, a more detailed description is provided of one method by which Digital Asset 221 may be retrieved by the Storage System 300. The method involves the use of the Storage Executive 320 and the Storage ID, Compression and Encryption Subsystem 350. The retrieval of the Digital Asset 221 begins when a retrieval request containing the Private Storage ID of a Storage Instance 222 is received by the Storage Executive 320 via the Request and Reply Interface 310 from the Distributed Ledger Node 201. The Storage Executive 320 queries the Storage Data ID 372 portion of the Database 370 for the Private Storage ID. If found, the Storage Executive uses the Public Storage ID associated with the Private Storage ID to retrieve the Storage Instance 222 associated with the Digital Asset 221 from the Storage Instance's 222 designated Private Storage 420 and/or Public Storage 440 location and/or locations. For the sake of efficiency, in the event that a copy of the specified Storage Instance 222 exists in more than one location, a single location may be specified so that only one copy Body 226 of the Storage Instance 222 is returned. The Storage Executive 320 notifies the Storage ID, Compression and Encryption Subsystem 350 that the Digital Asset 221 as represented by the Body 226 or Bodies 226 of the Storage Instance 222 or Storage Instances 222 is available for processing.

The Storage ID, Compression and Encryption Subsystem 350 first uses the Private Storage ID to identify the key or keys associated with the Storage Instance in the Key Store 355 and uses those keys to decrypt the Body 226 of the Storage Instance 222. Following the decryption of the Body 226 of the Storage Instance 222, the Storage ID, Compression and Encryption Subsystem 350 uncompresses the Body 226 of the Storage Instance 222. The Storage ID, Compression and Encryption Subsystem 350 then calculates a hash of the Body 226 using the same hash function used when the Storage Instance 222 was originally stored by the Storage Executive 320 in the designated Private Storage 420 and Public Storage 440 location or locations. The Storage ID, Compression and Encryption Subsystem 350 returns the resulting hash value to the Storage Executive 320 which uses the hash value to query the Storage ID Data 382 portion of the Database 380 in order to determine whether or not the hash value already exists and is identical to the first hash value of the Body 226 created by the Storage ID, Compression and Encryption Subsystem 350 when the Body 226 associated with the Private Storage ID was originally stored in the specified Private Storage and/or Public Storage location or locations. Following verification of the hash value associated with the Body 226 of the Storage Instance 222, the Storage Executive 320 returns the Private ID and the Body 226 of the specified Storage Instance, along with any success or error codes, to the Distributed Ledger Node 201 using the Request and Reply Interface 310.

Figure 2A:
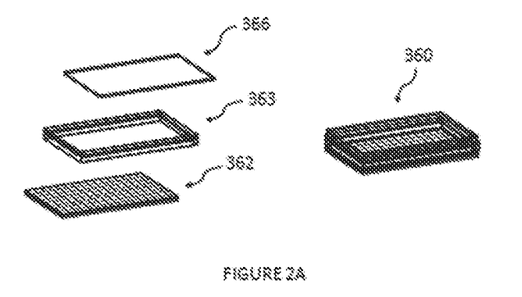
FIG. 2A illustrates a preferred embodiment for implementing an apparatus capable of using Brownian motion to generate random binary data for purposes of encryption in accordance with the principles of the present invention.

With reference now to FIG. 2A of the DRAWINGS, there is illustrated therein an exemplary representation of a Quantum Data Generator 360 apparatus pursuant to the teachings of the present invention. In particular, a Light Source 366, Brownian Motion Device 363 and Image Sensor 362 are used in combination to generate random binary data for purposes of random number and cryptographic key creation in accordance with the principles of the present invention. The Light Source 366 is used to generate light that passes through the Brownian Motion Device 363, thereby capturing random changes in the positions of microspheres contained in the Brownian Motion Device 363 by illuminating those pixels on the Image Sensor 362 surrounding the shadows of microspheres. The Light Source 366 may be constructed using energy sources that include, but are not limited to, a white light-emitting diode (i.e., LED) or a white organic light-emitting diode (OLED).

The Brownian Motion Device 363 includes a transparent material containing within it a suspension consisting of microspheres surrounded by molecules able to generate Brownian motion on the parts of the microspheres. The microspheres are preferably composed of an inert material such as polystyrene. The transparent material may consist of glass, plastic or a combination of the two that has been constructed to contain the suspension, as is understood to one of skill in the art.

Fabrication of a containment space for the microspheres and suspension fluid may be accomplished using a manufacturing process, such as polydimethylsiloxane (PDMS) based soft-lithography. The Image Sensor 362 captures the data resulting from the activation of pixels in the Image Sensor 362. The Image Sensor 362 may be constructed using either a frame transfer charge-coupled device (CCD) or a frame transfer complementary metal-oxide-semiconductor (CMOS) device. The use of frame transfers allows the data as represented by the binary changes in the positions of microspheres as well as the bit order of the resulting binary data to be calculated in software.

Figure 2B:
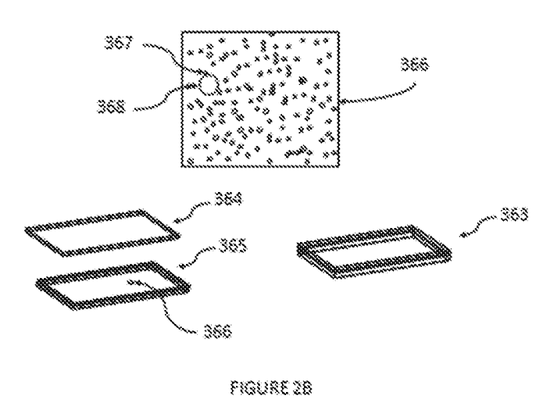
FIG. 2B illustrates a preferred embodiment for implementing an apparatus whereby Brownian motion is created.

With reference now to FIG. 2B of the DRAWINGS, a more detailed illustration is provided of one method whereby the Brownian Motion Device 363 may be constructed. A Microfluidic Container 365 containing microspheres suspended in a fluid is hermetically sealed with a Glass Slide 364. The resulting Brownian Motion, as seen in a Sample 366 of the solution as it might appear under a microscope, is the result of motion resulting from the collision of those molecules 367 comprising the fluid with the microspheres 368.

It should, of course, be understood that alternate configurations of the aforementioned Quantum Data Generator 360 are possible.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A system for storing and retrieving data in and from at least one remote storage location using a distributed ledger node, the system comprising:
    a distributed ledger comprising at least one distributed ledger node, the distributed ledger node comprising a storage module in electronic communication with the at least one remote storage location;
    the storage module comprising an encryption module for securing one or more digital assets for storage, the encryption module using quantum-event based encryption to generate one or more encryption keys for encrypting and decrypting the one or more digital assets;
    the storage module further comprising a policy rule base module for applying a set of rules to identify the locations of the once or more digital assets in the at least one remote storage location and at least one database for storing the set of rules and storage ID data associated with the one or more digital assets.

2. The system of claim 1, wherein the storage module further comprises a quantum data generator, and the encryption module obtains quantum-event based binary data from the quantum data generator.

3. The system of claim 1, wherein the one or more encryption keys comprise one or more of private symmetric keys, cryptographic keys for use in an asymmetric key algorithm, and one-time pads.

4. The system of claim 3, wherein the encryption module comprises a key store for maintaining the one or more encryption keys.

5. The system of claim 1, wherein the storage module further comprises a storage executive and a request and reply interface for managing storing and retrieving the one or more digital assets in and from the at least one remote storage location, the storage executive identifying header data and body data associated with each of the one or more digital assets, sending the one or more digital assets to the encryption module in cleartext form, receiving the one or more digital assets back from the encryption module in compressed and encrypted ciphertext form, storing the one or more digital assets in the at least one remote storage location using the request and reply interface, and maintaining storage ID data associated with the one or more digital assets in the database of the storage module.

6. The system of claim 5, wherein the storage executive obtains the locations of the one or more digital assets from the policy rulebase module and retrieves the one or more digital assets from the at least one remote storage location using the request and reply interface; and
    wherein the encryption module decrypts the one or more digital assets using the one or more encryption keys.

7. A method for storing and retrieving data in and from at least one remote storage location using a distributed ledger node, the method comprising the steps of:
    obtaining one or more digital assets;
    encrypting the one or more digital assets using quantum-event based encryption to generate one or more encryption keys;
    storing the one or more digital assets in the at least one remote storage location;
    identifying and storing in database storage ID data associated with the one or more digital assets;
    applying a set of rules to identify the location of the one or more digital assets in the at least one remote storage location using the storage ID data associated with the one or more digital assets,
    retrieving the one or more digital assets from the at least one remote storage location; and
    decrypting the one or more digital assets using the one or more encryption keys.

8. The method of claim 7, wherein the quantum-event based encryption comprises generating quantum-event based binary data.

9. The method of claim 7, wherein the one or more encryption keys comprise one or more of private symmetric keys, cryptographic keys for use in an asymmetric key algorithm, and one-time pads.

10. The method of claim 9, further comprising the step of storing the one or more encryption keys in a database.

11. The method of claim 8, further comprising the steps of identifying header data and body data associated with the one or more digital assets, the header data comprising the storage ID data and the body data comprising one or more of data source, content type, user, user group, user organization, creation date and time, size, owner, reading and modification permissions, and other metadata relating to originality, primacy, precedence, and provenance.

12. The method of claim 11, wherein encrypting the one or more digital assets comprises the steps of:
    creating a hash value from the one or more digital assets using a hash function such as a SHA-2 or SHA-3;
    concatenating the hash value with a random number generated from the quantum-event based binary data to create a unique ID hash; and
    associating the unique ID hash with the header data associated with the one or more digital assets.

13. The method of claim 12, wherein retrieving the one or more digital assets from the at least one remote storage location comprises the steps of:
    generating a retrieval request for the one or more digital assets from the distributed ledger node;
    identifying the one or more digital assets subject to the retrieval request based upon the unique ID hash associated therewith; and
    identifying the location of the one or more digital assets subject to the retrieval request based upon the storage ID data associated therewith and the set of rules for locating the one or more digital assets on the at least one remote storage location.

14. The method of claim 13, wherein decrypting the one or more digital assets comprises the steps of identifying the encryption key associated with the one or more digital assets subject to the retrieval request and using the encryption key to decrypt the one or more digital assets.

* * * * *